United States Patent [19]

Schurmans

[11] 4,402,870

[45] Sep. 6, 1983

[54] CATALYST CARRIER

[76] Inventor: Jacques Schurmans, Rue Theodore de Cuyper 157, 1200 Brussels, Belgium

[21] Appl. No.: 316,638

[22] Filed: Oct. 30, 1981

[30] Foreign Application Priority Data

Nov. 26, 1980 [BE] Belgium ................................ 202946
Aug. 24, 1981 [EP] European Pat. Off. ............ 200933.0

[51] Int. Cl.³ .............................................. B01J 35/02
[52] U.S. Cl. .................................. 252/477 R; 428/156
[58] Field of Search ..................... 252/477 R; 428/156

[56] References Cited

U.S. PATENT DOCUMENTS

| | | | |
|---|---|---|---|
| 2,408,164 | 9/1946 | Foster | 252/467 X |
| 4,133,777 | 1/1979 | Frayer et al. | 252/469 X |
| 4,233,187 | 11/1980 | Atwood et al. | 252/466 J |
| 4,328,130 | 5/1982 | Kyan | 252/477 R |

*Primary Examiner*—W. J. Shine
*Attorney, Agent, or Firm*—Wm. R. Price

[57] ABSTRACT

A nickel catalyst, for the reforming of hydrocarbons, to produce a hydrogen-rich gas, consists of cylindrical or solid prismatic carriers, having exterior lateral walls which are grooved, in which the spacing, depth and width is such that in relation to a non-grooved cylinder or prism of identical composition, height and size, the gas-solid contact surface is increased while the crush strength is maintained.

8 Claims, 13 Drawing Figures

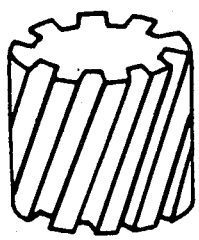
FIG. 1a
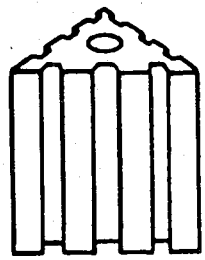
FIG. 1b
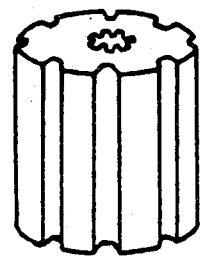
FIG. 1c
FIG. 2a
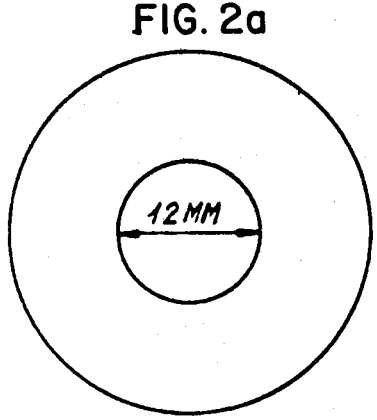
FIG. 2b
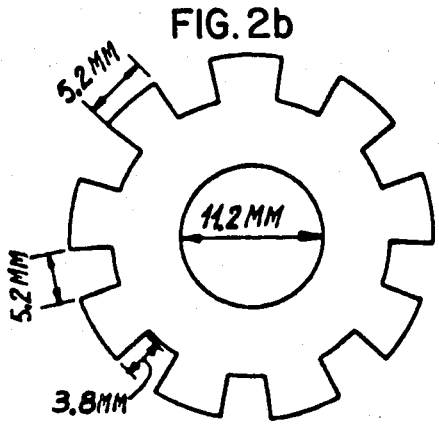
FIG. 2c
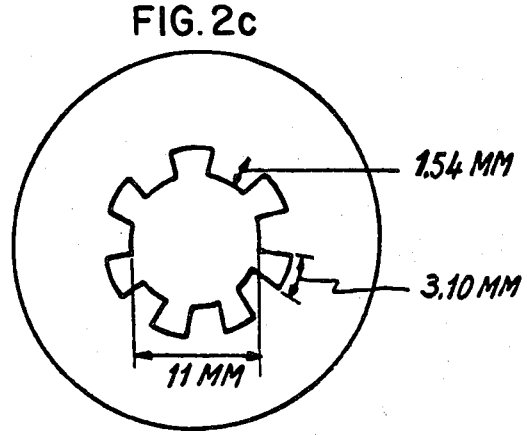

CATALYST CARRIER

FIELD OF THE INVENTION

This invention concerns an improved version of the reforming catalysts for hydrocarbons.

BACKGROUND OF THE INVENTION

The reforming catalysts for hydrocarbons usually contain nickel as the active element; the nickel being added either (1) by dipping the pre-shaped ceramic structures in nickel-salt solutions; these ceramic structures may contain aluminium, magnesium, silica, alcaline oxides, titanium, CaO, and rare earth oxides may be used as stabilisers. In addition, for particular applications of heavier hydrocarbon feeds, the nickel may be promoted with the oxides of iron and manganese, and optionally barium or (2) by mixing or coprecipitating the nickel or its compounds prior to shaping the catalyst.

Usually reforming catalysts are presented in the form of solid cylinders, cylindrical rings, spheres or granules.

In the last few years particular attention has been given to the size and shape of the catalysts. The form and size of the catalysts have an important effect on pressure drop and catalyst activity, and on its possibilities as concerns heat transfer and crush strength.

A new catalyst form is described in French Pat. No. 2,328,656. This patent describes a catalyst composed of a hollow cylinder with axial divisions; this arrangement effectively presents a much greater contact surface, which automatically increases catalyst activity since one of the limiting factors of the velocity of the catalyst reaction is the diffusion of the reactants of the catalyst's elements; furthermore, this structure makes it possible to obtain lower pressure drop in the reforming reactor, whether it be of the tubular or adiabatic types.

Four main characteristics are expected from a reforming catalyst:

1. Good mechanical resistance: this characteristic is particularly important in the tubular reforming furnaces where the catalyst is subjected to severe contraints, particularly at shutdowns of the furnace. Thus, for a catalyst having a given chemical composition and microscopic structure, the size and shape of the catalyst have a determining effect on the mechanical resistance of the catalyst.

This mechanical resistance is measured by the crush strength and resistance to shocks.

2. High Activity: This characteristics makes it possible to reduce the required volume of catalyst, or with equal volumes to improve the performance of the catalytic reactor. Further, in the case of tubular reformers, high activity makes it possible to reduce tube temperatures and thus the energy consumed in heating.

Since the diffusion velocity of the gases in reaction is a limiting factor in the velocity of catalysis, it is preferable, for a catalyst with a given chemical composition and microscopic structure, to increase the contact surface between the reacting gas and the catalyst.

A classic way to obtain a large surface contact is to use small catalyst elements; for example cylindrical rings with a small diameter and height—but this will provoke an increase of the pressure drop—which can become prohibitive.

3. A high heat transfer coefficient: this characteristic is important in the tubular reforming furnaces. A good transfer coefficient allows a reduction in the volume of catalyst required or a reduction of the operating temperatures and energy consumption. This phenomenon of heat transfer taking place through the tube wall and through the piling up of the catalyst in the tube from the outside tube surface is a complex phenomenon which introduces different types of heat transfer.

A small pressure drop, but nonetheless enough to ensure a suitable distribution of the reacting gases in the tubes of the tubular furnaces or in the catalytic mass of the adiabatic reactors is advantageous for a catalyst with a given chemical composition and microscopic structure, this can be obtained by increasing the particle sizes of the catalyst, by increasing the void space in the catalytic bed and by decreasing the friction surfaces between the gas and the catalyst's particles.

As can be seen from the above, for a catalyst with a given chemical composition and microscopic structure, the shape and size have a considerable effect on the catalyst behaviour. Changes in these two characteristics can have contradictory influences on its behaviour, e.g. if we consider a spherical shaped catalyst, we will notice that a decrease of the diameter of the spheres will have an unfavourable influence on the pressure drop and the overall rate of heat transfer, but a favourable influence on the activity of the catalyst.

Moreover, for a catalyst of a specified chemical composition and microscopic structure, the optimum choice of size and shape of the catalyst particles will depend not only on the operating conditions, but also, for example, in the case of tubular reactors, on the diameter of the tubes of the reactor.

This invention concerns a new catalyst form which can be produced cheaply, which presents a high contact surface, which gives a relatively low pressure drop, which ensures a high heat transfer and which offers a good mechanical resistance.

SUMMARY OF THE INVENTION

This invention concerns a nickel catalyst for reforming hydrocarbons in tubular furnaces or in adiabatic reactors on a continuous or a cyclic operation. This catalyst is characterized by the fact that it is presented in the form of a cylindrical ring grooved on its outer cylindrical surface and/or on the inner surface—or in the form of a solid cylinder, grooved on the exterior cylindrical surface; these grooves having a specific width, depth, spacing and orientation determined so as to optimize the catalyst's activity, to increase its properties of heat transfer, to give a minimum pressure drop while maintaining a good mechanical resistance; alternatively, the catalyst of the concerned invention can be presented in the form of a prism with or without axial perforations, and with grooves on its outer lateral surface and/or on the inner surface.

BRIEF DESCRIPTION OF THE DRAWINGS

FIG. 1a illustrates a solid cylindrical carrier structure with grooves on the outer wall, running diagonally from bottom to top;

FIG. 1b illustrates a triangular prism having a central bore and vertical grooves on the outer walls; and FIG. 1c illustrates a cylindrical catalyst carrier body having spaced vertical grooves on the outer wall and an internally grooved, centrally located bore.

FIG. 2a illustrates in top elevational view a conventional, prior-art catalyst body in the form of a ring.

FIG. 2b illustrates in top elevational view a cylindrical catalyst body having equally spaced grooves running vertically along the walls of the exterior of the catalyst, and having a centrally disposed bore.

FIG. 2c illustrates in top elevational view, a carrier body having an internally grooved bore.

DESCRIPTION OF THE PREFERRED EMBODIMENT

Figure 3A:
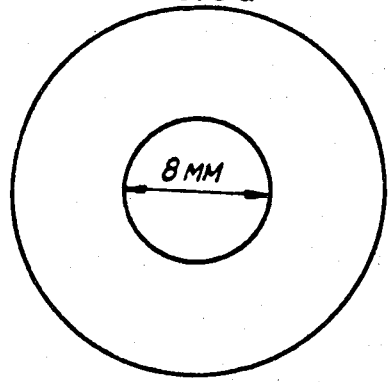
FIG. 3a illustrates, in top elevational view, a conventional prior-art carrier body in the form of a ring.

FIG. 1 gives an example of different catalyst elements of this invention.

(a) grooved solid cylinder—the grooves not being parallel to the axis of the cylinder.

(b) triangular prism with a central ungrooved hole and grooves parallel to the axis on the outer lateral surface.

(c) cylindrical ring with grooves on the inner and outer lateral surfaces.

To facilitate manufacturing and for reasons of crush strength of the catalyst, preference should be given to using cylindrical rings when the conditions of use of the catalyst require elements with a large external diameter (for instance greater than 8 mm); or to using solid cylinders when the conditions of use require catalyst elements with a small external diameter.

For the same reasons it is not recommended to make grooves on the inner wall of rings with a small exterior diameter (for instance less than 15 mm); these inner grooves would in this case only have a marginal effect on the contact surface and might jeopardize the crush strength of the catalyst element.

Always for reasons of facilitating manufacture preference should be given to grooves parallel to the axis of the catalyst element. Moreover, it is important that the dimensioning of the teeth and of the grooves avoids or allows only small interpenetration of the catalyst elements with each other.

1. Forms (a) grooved solid cylinders: when the external diameter is small (e.g. less than 6–10 mm).

(b) cylindrical rings with grooves only on outer lateral surface, when the external diameter is medium or large (e.g. greater than 6–10 mm).

(c) cylindrical rings with grooves only on inner lateral surface when the external diameter is large (e.g. greater than 15–20 mm).

(d) cylindrical rings with inner and outer grooves: when the external diameter is large (e.g. greater than 15–20 mm).

The grooves will preferably be parallel to the axes of the rings and the cylinders.

2. Internal diameter of the rings according to (b), (c) and (d).

For reasons of crush strength, the internal diameter will be proportional to the external diameter according to the formula $$d = KD$$

where K is a coefficient without dimension, between 0.35 and 0.45 and preferably between 0.34 and 0.38.

3. Number of external grooves N

Will usually be between 7 and 15 and preferably between 8 and 11. As will be pointed out hereinafter, the number of interior teeth and the number of interior grooves i.e. those within the interior bore as illustrated in FIG. 1c, are less than the number of exterior grooves and the number of exterior teeth and range in number from 5 to 11. Thus, the total grooves i.e. both external and internal range in number from 5 to 15.

4. Height of cylinders and of cylindrical rings H

The height/diameter ratio of the catalyst element can vary in extreme proportions between 0.3 and 1.5. The choice of this ratio will in each case be determined as a function of the following imperatives: pressure drop, activity, diameter of the reactor and of the tubes of the reactor.

5. Form of the teeth

For reasons of ease of manufacture, the lateral walls of the teeth will preferably be parallel. The edges of the grooves and of the teeth will be either sharp or slightly rounded.

6. Depth of the outer grooves (1) P

The depth is limited so as to maintain a sufficient crush strength of the catalyst element. Generally the ratio "depth of the teeth P/exterior diameter D" will range between 0.10 and 0.15 and preferably between 0.12 and 0.135. The ratio of the depth of the teeth P to the external diameter D thus defines a ratio P:D in the range of from 0.1:1 to 0.15:1.

7. Width of the exterior teeth (2) L

The width is also determined by crush strength considerations. Generally the ratio L d/E will range between 0.12 and 0.25 and preferably between 0.15 and 0.20.

8. Distance between 2 consecutive exterior teeth (2) $L_c$.

This distance is fixed to avoid interpenetration of the catalyst elements or to reduce the possibilities of interpenetration. Usually the $L_c/L_d$ ratio will range between 0.8 and 1.05.

9. Number of interior grooves (3)n: n will usually be identical to N.

In addition, the interior grooves will preferably be arranged in the radial alignment of the exterior teeth.

When N=0 (ie. internal grooves only), n will usually be between 5 and 11, and preferably between 5 and 9.

10. Depth of interior grooves (3) p:

Generally the p/d ratio will range between 0.10 and 0.15.

11. Width of interior teeth (4) $l_d$:

Generally the $l_d/d$ ratio will range between 0.12 and 0.25 and preferably between 0.15 and 0.20.

12. Distance between two consecutive interior teeth (4) $l_c$:

The $l_c/l_d$ ratio will range between 0.5 and 1.2 and preferably between 0.8 and 1.05.

The advantages of the subject catalysts of this invention are evidenced by the following examples:

EXAMPLE 1

An alumina gel is prepared by the action of nitric acid on a mixture of alumina hydrate, alpha-alumina, organic binding elements and water in order to obtain a paste ready for extruding. After extrusion and cutting of the paste, the support elements of the catalyst are treated at temperatures up to 1550° C. The support elements are then dipped in a nickel nitrate solution and thermally treated at temperatures reaching up to 600° C., so as to decompose the nickel nitrate to NiO; the dipping operations and the thermal treatments are repeated until a nickel content of 12% in weight is obtained (see French Pat. No. 2,328,656).

The final composition of the catalyst is as follows:
alpha-alumina: 85%
NiO: 15%.

Three catalyst forms have been considered and are described in FIG. 2:

FIG. 2a describes a classical cylindrical ring;

FIG. 2b describes a catalyst element according to the invention, either a grooved cylindrical ring, or a cylindrical ring grooved on its exterior surface; the grooves in this example are parallel to the axis of the ring;

FIG. 2c describes a catalyst element according to the invention, a cylindrical ring grooved on the internal surface, the grooves in this example are parallel to the axis of the ring.

In the three cases the production processes of the catalyst are identical so as to obtain an identical porosity and specific surface (respectively 0.14 cm$^3$/gr and 1 m$^2$/gr).

The characteristics of the three catalyst forms are compared in the following table:

| Type | 2a classical ring | 2b external grooved ring | 2c internal grooved ring |
| --- | --- | --- | --- |
| external diameter mm | 30 | 30 | 30 |
| height, mm | 20 | 20 | 20 |
| interior diameter, mm | 12 | 11 | 14/11 |
| porosity, in cm$^3$/gr | 0.14 | 0.14 | 0.14 |
| specific surface in m2/gr | 1 | 1 | 1 |
| contact surface in cm$^2$/liter | 1,590 | 1,939 | 1,730 |
| crush strength (in kg/applied laterally) | 123 | 117 | 118 |

If one compares the activity of the three catalysts, which is practically proportional to the contact surface, one observes that the activity of the external grooved catalyst according to 2b is approximately 16% higher than that of 2a and the internal grooved catalyst according to 2c is approximately 9% superior to 2a.

On the other hand, comparative tests on pressure drop give the following comparative results:

|  | Classical catalyst according to 2a | External grooved catalyst according to 2b | Internal grooved catalyst according to 2c |
| --- | --- | --- | --- |
| Measured pressure drop (base = 1 for classic catalyst according to 2a) | 1 | 0.73 | 1.02 |
| Calculated pressure drop (base = 1 for classic catalyst according to 2a) | 1 | 0.68 | 0.99 |

These comparative tests have been carried out under the following conditions:
Interior diameter of the tube: 200 mm
Height of the catalyst: 3 m
Fluid: Air at 25° C.
Pressure at the inlet of the tube: 3 atm
Flow: 450 Nm$^3$/h.

EXAMPLE 2

A mixture of nickel oxide, alumina water and calcium aluminate based cement is made. Graphite is added to this mixture and then it is dried at a moderate temperature. After granulation, the mixture is compressed in a tabletting machine in the form of rings. The rings are then treated in an autoclave at a steam pressure of 6 atmospheres and afterwards at temperatures that may reach 400° C. (see U.S. Pat. Nos. 3,359,215 and 3,445,402). The final composition of the catalyst is as follows:
NiO: 20%
CaO: 7%
Al$_2$O$_3$: 72%
Graphite: 1%

Four types of rings are prepared following this procedure. They have the size and form as described in FIG. 3.

Figure 3B:
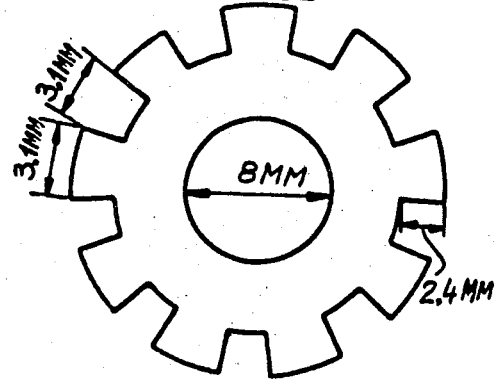
FIG. 3b illustrates, again in top elevational view, a cylindrical body having equally spaced grooves and projecting teeth with a smooth centrally located bore.
Figure 3C:
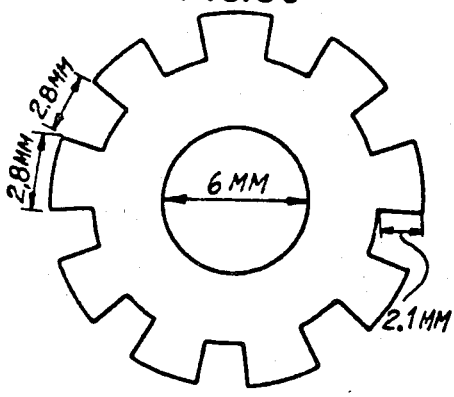
FIG. 3c and FIG. 3d both illustrate, in top elevational view, a cylindrical body having equally spaced grooves around its circumference, defining projecting teeth, and a smooth centrally located bore.
Figure 3D:
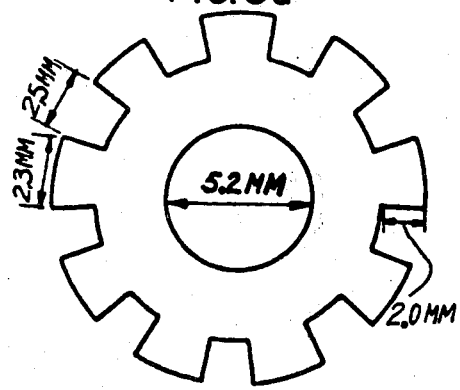

|  | FIG. 3a classic ring | FIG. 3b grooved ring | FIG. 3c grooved ring | FIG. 3d grooved ring |
| --- | --- | --- | --- | --- |
| Ext. diam. (mm) | 16 | 18 | 16 | 14 |
| Height (mm) | 16 | 18 | 16 | 14 |
| int. diam. (mm) | 8 | 8 | 6 | 5.2 |
| relative contact surface (base FIG. 3a = 1) | 1 | 0.96 | 1.16 | 1.38 |
| relative pressure drop (base FIG. 3a = 1) | 1 | 0.80 | 0.84 | 1.08 |

We see that the grooved ring according to 3c presents a contact surface and thus an activity which is 16% higher and a pressure drop 6% lower in relation to the classic ring according to 3a. The grooved ring according to 3d offers a contact surface which is 38% higher; the pressure drop is 8% higher than the ring.

On the other hand, the contact surface of the grooved ring is 4% lower than to that of the classic ring, but then the pressure drop is 20% less than the one of the classic ring.

This example shows that when varying the dimensions of the grooved rings, it is easy to substantially improve the pressure drop, the catalyst activity or both these characteristics when compared to the classical rings.

EXAMPLE 3

Figure 4A:
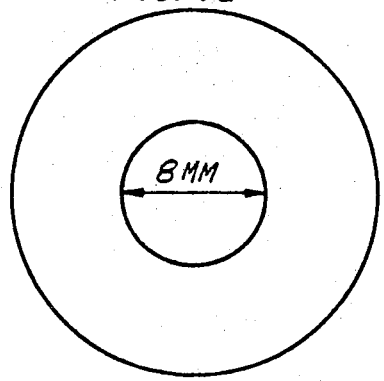
FIG. 4a illustrates, in top elevational view, a prior-art carrier body, in the form of a ring.
Figure 4B:
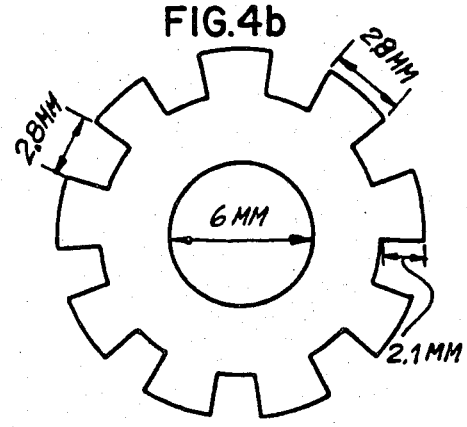
FIG. 4b illustrates, again in top elevation, a cylindrical carrier body having a centrally located smooth bore and having vertical grooves, equidistantly spaced around the circumference, which define projecting teeth having a width equal to the width of the opening of the groove.
Figure 5:
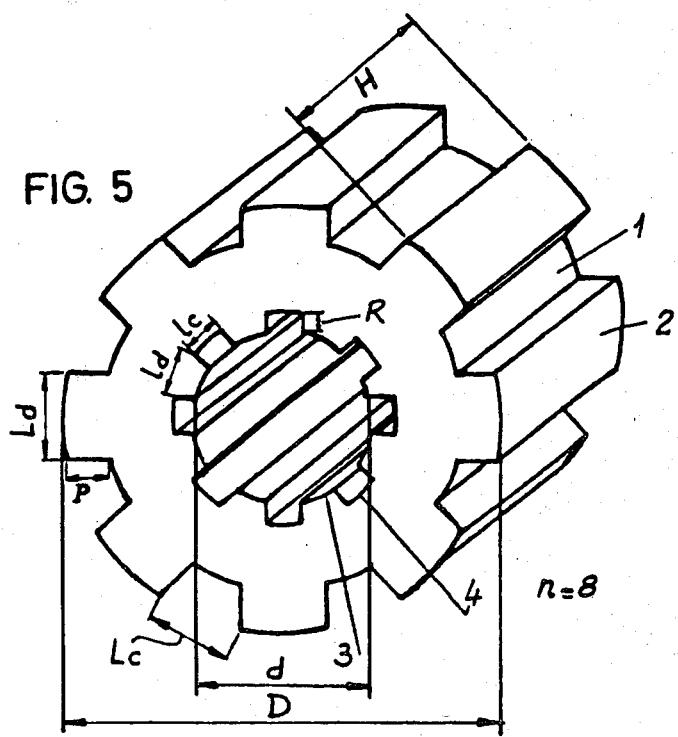
FIG. 5 is an isometric view of a cylindrical catalyst externally grooved teeth and an internal bore having internally projecting teeth which illustrates the relationship of the external teeth to each other and the relationship of the internal teeth to each other, as well as the relationship of the external teeth to the internal teeth.

Two types of rings are prepared following the procedure described in example 1; but in this case, the rings are treated at a temperature of 1450° C. (and not 1.550° C.) before being dipped in the nickel nitrate solution. These 2 types of rings are described in FIGS. 4a and 4b.

Their main characteristics are as follows:

|  | 4a classical ring | 4b grooved ring |
|---|---|---|
| Ext. diameter mm | 16 | 16 |
| Height, mm | 6 | 6 |
| Int. diameter mm | 8 | 6 |
| Porosity (cm³/gr) | 0.17 | 0.17 |
| Specific surface (m²/gr) | 3–4 | 3– |
| lateral crush strength (in kg) | 28–35 | 28–37 |
| Contact surface, m²/liter | 3,660 | 4,003 |
| Relative pressure drop (base = 1 for the classic ring according to 4a) | 1 | 0.86 |

Tests of heat transfer applied to these two types of rings show the superiority of the grooved rings. These tests were carried out as follows: a layer of catalyst of 250 mm height is placed in a vertical tube with an internal diameter of 75 mm. Air is circulated from the top to the bottom in the tube which is heated from the outside by radiation by gas burners. The quantity of transferred heat can be determined by measuring the temperature and the flow.

The experiments were carried out under the following conditions:

| Temperature of the air at entry of the tube °C.: | 400 to 550 |
|---|---|
| Temperature of the air at exit of the tube °C.: | 650 to 800 |
| Temperature of the exterior wall of the tube °C.: | 700 to 900 |
| Air flow kg/h | 50 to 150 |
| Pressure at entry of the tube, atmospheres: | 1.5 to 2 |

The coefficient of heat transfer is determined as follows:

$$dQ = h \times dS \times dT \quad h = \frac{dS \times dT}{dQ}$$

where:
h: coefficient of heat transfer (in kcal/hour, m², °C.)
dQ: quantity of transferred heat (in kcal/hr)
dS: transfer surface calculated on the exterior tube wall (m²)
dT: Temperature difference between the tube wall and the gas.

The following average heat transfer coefficients were found for the two catalysts after having varied the operating conditions in a wide range.
classic rings according to 4a: h: 153
grooved rings according to 4b: h: 177

It is thus shown that for a catalyst with a given composition and a microscopic structure, the catalysts of the invention offer not only an improved activity and a reduced pressure drop but also better conditions of heat transfer. The results obtained make it possible to predict e.g. the effect on the decrease of the required maximum temperature on the exterior wall of the tube to obtain a specific yield of the reforming reaction.

The following table gives the predicted values for that maximum temperature as well as the experimental values:

|  | Values foreseen (°C.) | Experimental values (°C.) |
|---|---|---|
| Classical rings (4a) | 900 | 890 |
| grooved rings (4b) | 865 | 850 |

EXAMPLE 4

Rings with the following chemical composition are prepared by tabletting (measured after thermal treatment at 900° C.):
NiO: 23.1%
CaO: 17.2%
SiO$_2$: 10.5%
K$_2$O: 6.8%
Al$_2$O$_3$: 32.1%
MgO: 10.3%

Two types of rings are prepared; the first rings according to the classical type are given in FIG. 3a; the second type, following the invention, are described in FIG. 3c. The main geometrical characteristics are given in example 2.

These two types of catalysts are particularly well suited for the reforming of hydrocarbons with a molecular weight higher than that of natural gas, and particularly for the reforming of naphtha (see Belgian Pat. Nos. 607,419 and 648,328).

Comparative activity tests have been carried out under the following conditions:
used naphtha:
  Initial boiling point: 60° C.
  Final boiling point: 197° C.
  Aromatics: 7.7%
  Molar mass: 87.7%
Pressure: 10 atm
Inlet temperature: 450° C.
Outlet temperature: 650° C.
Space velocity: 0.7 liters naphtha per liter of catalyst and per hour
molar ratio steam/carbon: 3

The test is carried out in a reactor of 50 mm diameter, containing a volume of 0.5 liter catalyst.

The space velocity and temperature are such as they allow the comparison of activity of the two types of catalysts by simply measuring the residual quantities of $C_2H_6$ and $C_2H_4$ present in the gas at the outlet of the reactor (high contents correspond to a low activity).

Following results were obtained:

|  | Catalysts according to 3a | Grooved catalyst according to 3b |
|---|---|---|
| % $C_2H_6$ (molar % on dry gas) |  |  |

-continued

|  | Catalysts according to 3a | Grooved catalyst according to 3b |
|---|---|---|
| after 50 hours | 0.31 | 0.17 |
| after 100 hours | 0.42 | 0.19 |
| after 150 hours | 0.32 | 0.19 |
| % $C_2H_4$ (molar % on dry gas) |  |  |
| after 50 hours | 0.27 | 0.05 |
| after 100 hours | 0.20 | 0.06 |
| after 150 hours | 0.19 | 0.06 |

As could be foreseen, the grooved ring improves the results of the classic ring by its better coefficient of heat transfer, by its greater contact surface and thus by its higher activity.

EXAMPLE 5

Rings were manufactured on an alumina support according to the methods of French Pat. No. 76 36955 and with the following metal compositions.

|  | Type 1 | Type 2 |
|---|---|---|
| Ni | 11.0 | 9.29 |
| Mn | 1.1 | 0.94 |
| Fe | 1.48 | 1.33 |
| Ba | 1.67 | 0 |

A loading of 70% type 1 (top)/30% type 2 (bottom) was tested on steam reforming of naphtha in a 50 mm diameter externally heated tube, under the following conditions

| Pressure | 450 psig |
|---|---|
| THSV | 2000 |
| Temp in | 850 F. |
| Temp out | 1200 F. |
| S/C | 3.0 |
| naphtha | $C_7H_{14}$ |

As before two forms of rings were prepared and compared in performance, the first set of rings according to the classical type as FIG. 3a; the second set, following the invention, as described in FIG. 3c. The main geometrical characteristics are given in example 2. The following results were obtained:

|  | Catalyst form | |
|---|---|---|
|  | 3a | 3c |
| after 24 hrs, $CH_4$ exit | 27.0 | 24.8 |
| 48 hrs, $CH_4$ exit | 26.2 | 23.6 |
| 72 hrs, $CH_4$ exit | 26.1 | 23.5 |

The improved heat transfer and the superior activity of the grooved ring compared to the classical ring is illustrated in this example by the lower $CH_4$ level exiting the tube; i.e. a closer approach to the theoretical equilibrium of the reaction.

What is claimed is:

1. A solid shaped ceramic carrier, having a specific surface in the range of from 1-4 $m^2$/gm, and having walls containing between 5 and 15 grooves, said grooves being aligned parallel to each other and forming teeth T, the depth P of said teeth, bearing a ratio to the external diameter D of said carrier in the range of from 0.1:1 and 0.15:1 (P:D), the distance between consecutive teeth Lc bearing a ratio to the width of the crown of the individual teeth Ld in the range of from 0.8:1 and 1.05:1 (Lc:Ld) and the height H to the diameter D ratio of said carrier lying between 0.3:1 to 1.5:1 (H:D).

2. A carrier, as defined in claim 1, having an interior bore running axially the length of said carrier, the interior walls circumferentially surrounding said interior bore having grooves, the number of grooves on the interior walls of said bore being between 5 and 11 and the distance between consecutive teeth formed by said grooves being in the range of from 0.5:1 and 1.2:1 (1c:1d).

3. A carrier, as defined in claim 1, in which the shape of the ceramic carrier is cylindrical.

4. A carrier, as defined in claim 1, in which the shape of the carrier is of a non-cylindrical prism.

5. A carrier, as defined in claim 2, in which both of the exterior walls of the carrier are grooved as well as the interior walls of the axial bore.

6. A carrier, as defined in claim 2, in which the distance between the consecutive teeth on the interior wall is between 0.8:1 and 1.05:1 (1c:1d) wherein the distance between the teeth is expressed as 1c and the width of the crown of the tooth is expressed as 1d.

7. A carrier, as defined in claim 1, in which said grooves are axially aligned on said carrier.

8. A carrier, as defined in claim 2, in which the diameter d of the bore bears a relationship to the external diameter D of the carrier of between 0.35:1 and 0.45:1 (d:D).

* * * * *